(12) United States Patent
Kim et al.

(10) Patent No.: US 8,711,764 B2
(45) Date of Patent: Apr. 29, 2014

(54) APPARATUS AND METHOD FOR TRANSMITTING/RECEIVING DATA IN A COMMUNICATION SYSTEM

(75) Inventors: Dong-Ho Kim, Seoul (KR); Bang-Chul Jung, Seoul (KR); Dan-Keun Sung, Daejeon (KR); Yung-Soo Kim, Seongnam-si (KR); Young-Jun Hong, Seoul (KR); Sung-Soo Cho, Daegu (KR)

(73) Assignees: Samsung Electronics Co., Ltd. (KR); Korea Advanced Institute of Science and Technology (KAIST) (KR)

( * ) Notice: Subject to any disclaimer, the term of this patent is extended or adjusted under 35 U.S.C. 154(b) by 775 days.

(21) Appl. No.: 11/654,990

(22) Filed: Jan. 18, 2007

(65) Prior Publication Data

US 2007/0191024 A1 Aug. 16, 2007

(30) Foreign Application Priority Data

Jan. 18, 2006 (KR) .................. 10-2006-0005504

(51) Int. Cl.
*H04W 4/00* (2009.01)
*H04L 12/28* (2006.01)

(52) U.S. Cl.
USPC ............... 370/328; 370/420; 370/396

(58) Field of Classification Search
USPC ....................................... 370/328
See application file for complete search history.

(56) References Cited

U.S. PATENT DOCUMENTS

| | | | |
|---|---|---|---|
| 2003/0123396 A1* | 7/2003 | Seo et al. | 370/252 |
| 2004/0165596 A1* | 8/2004 | Garcia et al. | 370/395.21 |
| 2004/0184471 A1* | 9/2004 | Chuah et al. | 370/420 |
| 2005/0044464 A1 | 2/2005 | Costa et al. | |
| 2005/0050427 A1 | 3/2005 | Jeong et al. | |
| 2005/0053038 A1* | 3/2005 | Kimura | 370/333 |
| 2005/0053069 A1* | 3/2005 | Lundby | 370/390 |
| 2005/0074072 A1* | 4/2005 | Kim et al. | 375/267 |
| 2005/0113099 A1 | 5/2005 | Eriksson et al. | |
| 2005/0159166 A1* | 7/2005 | Jonsson et al. | 455/452.2 |
| 2005/0164641 A1 | 7/2005 | Niwano | |
| 2005/0201296 A1 | 9/2005 | Vannithamby et al. | |
| 2005/0276266 A1* | 12/2005 | Terry | 370/394 |
| 2007/0030828 A1* | 2/2007 | Vimpari et al. | 370/335 |
| 2007/0254595 A1* | 11/2007 | Yoon et al. | 455/67.14 |
| 2007/0255994 A1* | 11/2007 | Michel et al. | 714/751 |
| 2008/0043704 A1* | 2/2008 | Geile | 370/342 |

FOREIGN PATENT DOCUMENTS

KR 1020050049299 5/2005

OTHER PUBLICATIONS

Bang Chul Jung et al., "Determining the Optimum Threshold Values of MCS Levels for Retransmission Packets in HARQ Schemes", Communication Networks Research Lab, p. 1935-1939, 2003.
JuYeop Kim et al., "Enhanced Adaptive Modulation and Coding Schemes Based on Multiple Channel Reportings for Wireless Multicast Systems", Sep. 25, 2005.

* cited by examiner

*Primary Examiner* — Lester Kincaid
*Assistant Examiner* — Andy Gu
(74) *Attorney, Agent, or Firm* — The Farrell Law Firm, P.C.

(57) ABSTRACT

A method and apparatus for transmitting/receiving data in a communication system are provided, in which an MCS level is determined for data, a codeword including the data and a parity is generated by encoding the data using the determined MCS level, code symbols are generated from the codeword using IR scheme, and each of the code symbols is sent in a corresponding subframe.

10 Claims, 4 Drawing Sheets

APPARATUS AND METHOD FOR TRANSMITTING/RECEIVING DATA IN A COMMUNICATION SYSTEM

PRIORITY

This application claims the benefit under 35 U.S.C. §119(a) of a Korean Patent Application filed in the Korean Intellectual Property Office on Jan. 18, 2006 and assigned Serial No. 2006-5504, the entire disclosure of which is incorporated herein by reference.

BACKGROUND OF THE INVENTION

1. Field of the Invention

The present invention generally relates to an apparatus and method for transmitting/receiving data in a communication system. More particularly, the present invention relates to an apparatus and method for transmitting/receiving data using an Incremental Redundancy (IR) scheme.

2. Description of the Related Art

The provisioning of services with different Quality of Service (QoS) levels at high rates to users is an active research area for future-generation communication systems. Major future-generation communication systems are Institute of Electrical and Electronics Engineers (IEEE) 802.16d and IEEE 802.16e based systems. IEEE 802.16d differs from IEEE 802.16e in whether mobility is supported.

FIG. 1 illustrates a cell configuration for a typical IEEE 802.16e communication system.

Referring to FIG. 1, a single cell includes a Base Station (BS) 110 and a plurality of Mobile Stations (MSs) 120 to 150 (MS A to MS D). MS A to MS D are spaced from the BS 110 by different distances. In general, MS A to MS D are placed in different channel statuses according to the distances. The nearest MS, MS A is in the best channel status and the remotest MS, MS D, is in the most inferior channel status. The channel statuses between the MSs 120 to 150 and the BS 110 are affected by obstacles in between or interference from other signals as well as the distances. The channel statuses are estimated taking into account the distances only, by way of example.

Because of the different channel statuses of the MSs 120 to 150 within the cell, the BS 120 selects Modulation and Coding Scheme (MCS) levels for the MSs 120 to 150 according to their channel statuses and sends signals to the MSs 120 to 150 at the MCS levels. However, when sending common data to the MSs 120 to 150, the BS 110 uses the most robust of the available MCS levels so that the common data can be received normally even at the MS in the most inferior channel status, i.e. MS D. For notational simplicity, Multicast/Broadcast Service (MBS) data is taken as an example of the common data.

FIG. 2 illustrates transmission and reception of MBS data in the typical IEEE 802.16e communication system.

Referring to FIG. 2, upon the generation of MBS data 211 to be sent, the BS encodes the MBS data 211 with the most robust of the available MCS levels. Although an MCS level specifies both a coding rate and a modulation scheme, only the coding rate is considered in FIG. 2. Therefore, encoding of the MBS data 211 is shown without modulation of the MBS data 211 in FIG. 2.

The BS creates a codeword 213 having the MBS data 211 and a parity by encoding the MBS data 211 with the most robust MCS level and generates a plurality of code symbols 215 out of the codeword 213. It is assumed herein that five code symbols 215-1 to 215-5 are produced from the MBS data 211. The BS sends the five code symbols 215-1 to 215-5 in a plurality of subframes, that is, five subframes 217-1, 217-3, 217-5, 217-7, and 217-9, respectively. A subframe can be an Orthogonal Frequency Division Multiplexing (OFDM) symbol, for example. Specifically, the BS sends the code symbol 215-1 in the subframe 217-1, the code symbol 215-3 in the subframe 217-3, the code symbol 215-5 in the subframe 217-5, the code symbol 215-7 in the subframe 217-7, and the code symbol 215-9 in the subframe 217-9.

MSs serviced by the BS receive the five subframes and recover the MBS data 211 by decoding the subframes. Since the MBS data should reach even the MS having the most inferior channel status, the BS sends the MBS data using the most robust MCS level. Hence, allocation of downlink resources corresponding to the most robust MCS level leads to the decrease of resource efficiency.

Other MSs in channel statuses other than the most inferior channel status, for example, MSs near the BS, also receive the MBS data using the most robust MCS level despite their good channel statuses. Thus, they suffer unnecessary processing power consumption during decoding of the MBS data. Specifically, the MSs receive all of the five OFDM symbols and Fast Fourier Transform (FFT)-process them to thereby recover the MBS data, resulting in unnecessary power consumption in the processing.

SUMMARY OF THE INVENTION

An aspect of the present invention is to address at least the problems and/or disadvantages listed above and to provide at least the advantages described below. Accordingly, an aspect of the present invention is to provide an apparatus and method for transmitting/receiving data in a communication system.

Another aspect of the present invention provides an apparatus and method for transmitting/receiving data using IR scheme in a communication system.

A further aspect of the present invention provides an apparatus and method for transmitting/receiving data according to the channel statuses of receiving MSs with respect to each data type in a communication system.

In accordance with an aspect of exemplary embodiments of the present invention, there is provided a method for transmitting data in a communication system, in which an MCS level is determined for data, a codeword including the data and a parity is generated by encoding the data using the determined MCS level, code symbols are generated from the codeword using IR scheme, and each of the code symbols is sent in a corresponding subframes.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF PREFERRED EMBODIMENTS

The matters defined in the description such as a detailed construction and elements are provided to assist in a comprehensive understanding of preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention is intended to provide an apparatus and method for transmitting/receiving data in a communication system. Also, the present invention provides an apparatus and method for transmitting/receiving data using an Incremental Redundancy (IR) scheme in a communication system. Also, the present invention provides an apparatus and method for transmitting/receiving data according to the channel statuses of receiving Mobile Stations (MSs) i.e. data receivers with respect to each data type in a communication system.

For the sake of convenience', the present invention will be described in the context of an Institute of Electrical and Electronics Engineers (IEEE) 802.16e communication system. It is to be clearly understood that the data transmitting/receiving apparatus and method of the present invention are also applicable to other communication systems.

Figure 1:
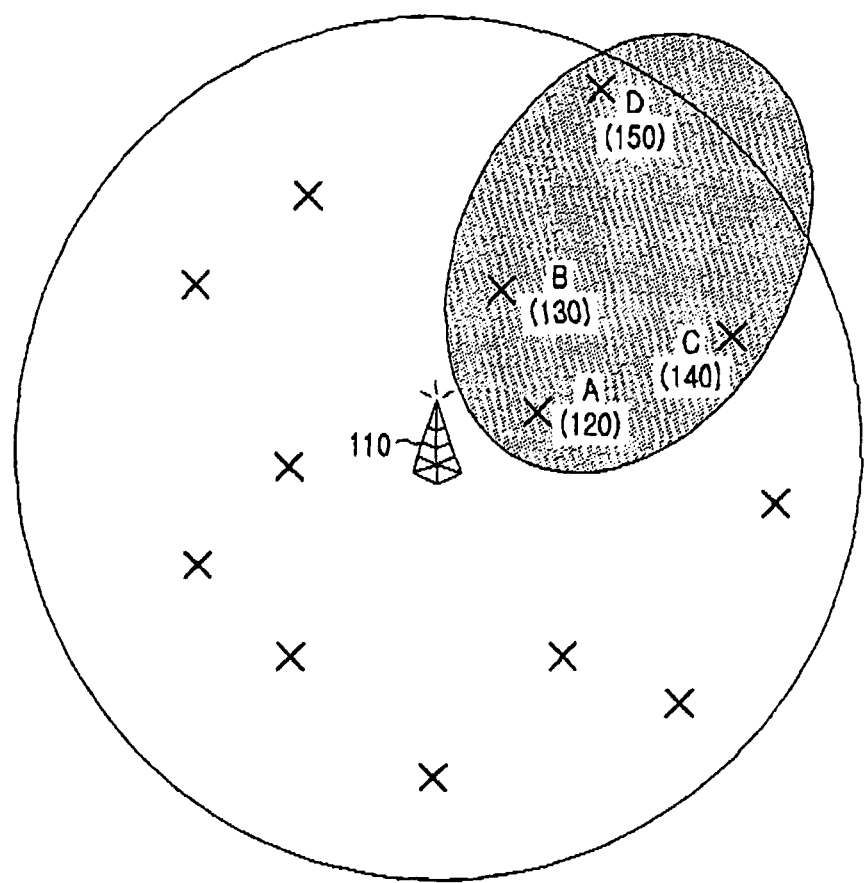
FIG. 1 illustrates a cell configuration for a typical IEEE 802.16e communication system.
Figure 2:
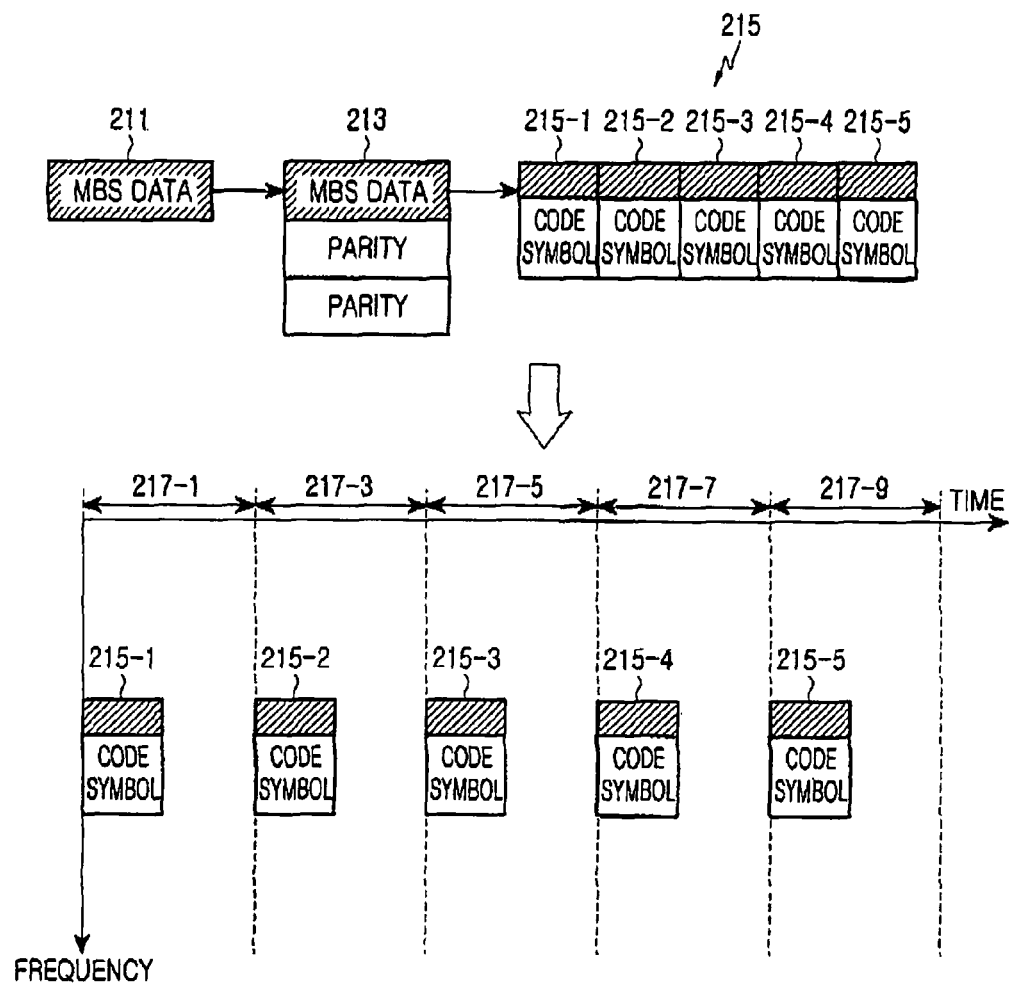
FIG. 2 illustrates transmission and reception of MBS data in the typical IEEE 802.16e communication system.

It is assumed that the IEEE 802.16e communication system has the configuration illustrated in FIG. 1. For notational simplicity, it is assumed that common data directed to a plurality of MSs within a cell is Multicast/Broadcast Service (MBS) data, while obviously, the common data is not limited to the MBS data.

Figure 3:
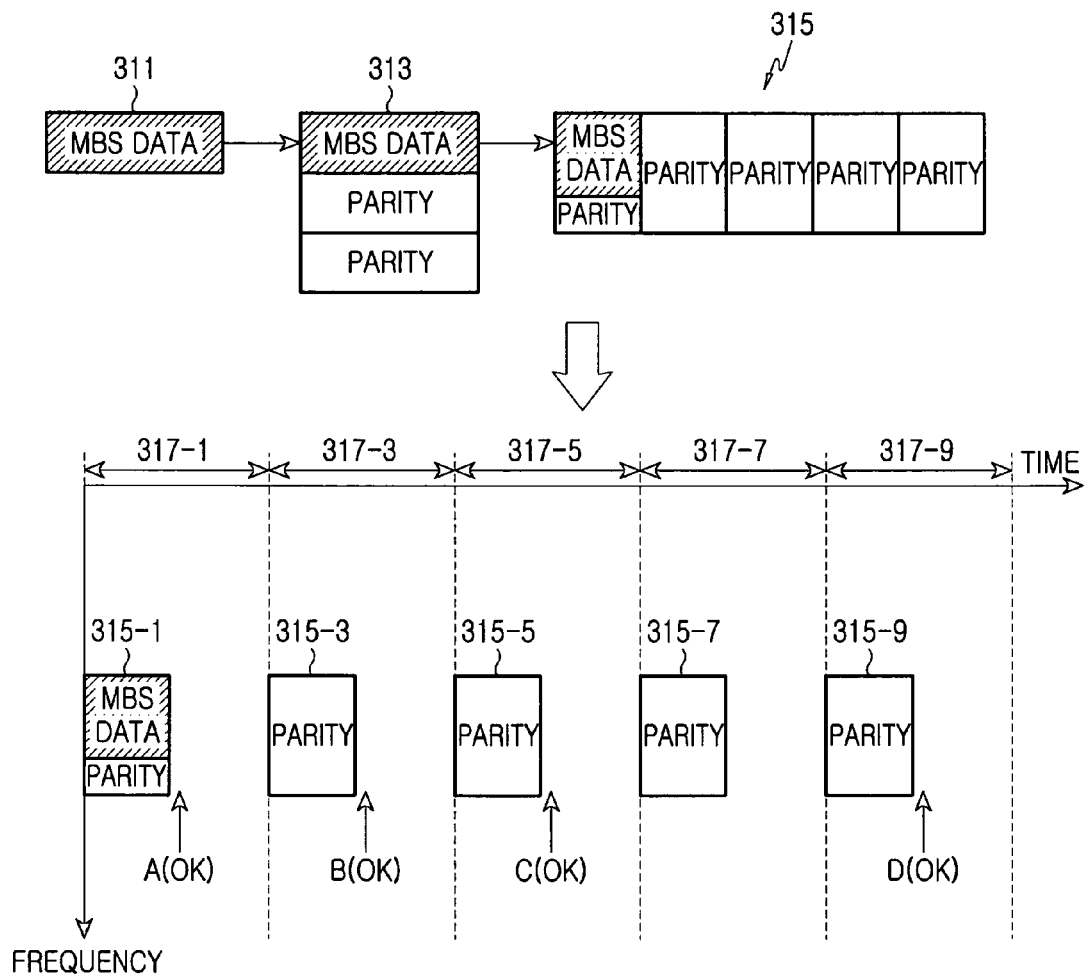
FIG. 3 illustrates transmission and reception of MBS data in an IEEE 802.16e communication system according to the present invention.

FIG. 3 illustrates transmission and reception of MBS data in the IEEE 802.16e communication system according to the present invention.

Referring to FIG. 3, upon generation of MBS data 311, a Base Station (BS) (i.e. an MBS data transmitter) encodes the MBS data 311 at the most robust of available Modulation and Coding Scheme (MCS) levels. Although an MCS level specifies a coding rate and a modulation scheme together, only the coding rate is considered in FIG. 3. Therefore, encoding of the MBS data 311 is shown without modulation of the MBS data 311 in FIG. 3.

The BS creates a codeword 313 having the MBS data 311 and a parity by encoding the MBS data 311 with the most robust MCS level and generates a plurality of code symbols 315 out of the codeword 313. It is assumed herein that five code symbols 315-1, 315-3, 315-7 and 315-9 are produced from the MBS data 311. In accordance with the present invention, IR scheme applies to the generation of the code symbols 315-1 to 315-9 using the codeword 313.

The BS sends the five code symbols 315-1 to 315-9 in a plurality of subframes, that is, five subframes 317-1, 317-3, 317-5, 317-7, and 317-9, respectively. A subframe can be an Orthogonal Frequency Division Multiplexing (OFDM) symbol, for example. Specifically, the BS sends the code symbol 315-1 in the subframe 317-1, the code symbol 315-3 in the subframe 317-3, the code symbol 315-5 in the subframe 317-5, the code symbol 315-7 in the subframe 317-7, and the code symbol 315-9 in the subframe 317-9.

In the IR scheme, the first of the code symbols 315 is a self-decodable symbol. The self-decodable symbol includes the MBS data 311 and part of the parity. The other code symbols include only additional parities for the MBS data. Thus, as the number of code symbols to be sent increases, an actual coding rate decreases in the IR scheme. In the case where an MS receives all of the code symbols, the coding rate is equal to that of the most robust MCS level.

The use of the IR scheme obviates the need for MSs, i.e. MBS data receivers to receive all of the subframes. Instead, the MSs sequentially receive as many subframes as needed, starting from the subframe 317-1. That is, an MS receives, the subframe 317-1, detects the code symbol 315-1 from the subframe 317-1, and decodes the code symbol 315-1. If the decoding is successful, the MS does not need to receive the other subframes 317-3 to 317-9. On the other hand, if the decoding fails, the MS receives the next subframe 317-3, detects the code symbol 315-3, and decodes the code symbol 315-3 by combining it with the code symbol 315-1. If the decoding is successful, the MS does not need to receive the other subframes 317-5, 317-7 and 317-9. In this manner, the MS receives subframes until the MBS data 311 is successfully recovered without the need for receiving the following subframes. Therefore, the number of Fast Fourier Transform (FFT) processes for the recovery of the MBS data 311 is minimized, thus minimizing power consumption for the FFT processing.

In the illustrated case of FIG. 3, MS A illustrated in FIG. 1 succeeds in recovering the MBS data 311 by receiving only the subframe 317-1. MS C recovers the MBS data 311 by receiving the subframes 317-1, 317-3 and 317-5, and MB D recovers the MBS data 311 by receiving all the five subframes 317-1 to 317-9.

The BS transmits the MBS data using the most robust MCS level irrespective of the type of the MBS data in FIG. 3. Yet, it can be further contemplated that MBS data is sent using an MCS level determined according to the channel statuses of MSs to receive the same type of MBS data.

For each serviced MBS type, the BS detects the channel statuses of MSs to receive MBS data by, for example, feed back Channel Quality Information (CQI) received from the MSs. All the MSs of each MBS type feed back the CQI to the BS. The BS commands the MS in the most inferior MS to periodically feedback a CQI every first period and also commands the other MSs to periodically feedback CQIs every second period. The second period is longer than the first period.

As the MS in the most inferior channel status feeds back a CQI to the BS in a relatively short period (first period) and the other MSs feed back CQIs to the BS in a relatively long period (second period), consumption of uplink resources for the CQI feedback is minimized and thus resource efficiency is increased.

On an MBS type basis, the BS selects an MCS level for MBS data according to MSs to receive the MBS data. Thus, if the MSs are placed in a relatively good channel status, the BS sends the MBS data using an appropriate MCS level other than the most robust MCS level to the MSs.

For example, if MSs to receive MBS data of a specific MBS type are MS A to MS D illustrated in FIG. 1, the BS determines an MCS level for the MBS data, considering the channel status of MS D which demonstrates the most inferior channel status. The channel statuses of the MSs are affected by obstacles between the MSs and the BS or interference from other signals as well as the distances to the BS, the channel statuses are estimated taking into account the distances only, by way of example.

For example, if an MCS level determined according to the channel status of MS D is the most robust one, the BS sends the MBS data in the manner described with reference to FIG. 3. When MS D discontinues the MBS data of the specific MBS type, the BS selects an MCS level taking into account of the channel status of MS C.

If the MCS level determined according to the channel status of MS C is not the most robust one, the BS can send fewer subframes than the five subframes using a higher coding rate in FIG. 3. The resulting decrease of downlink resources used for MBS data transmission leads to the increase of resource efficiency.

Figure 4:
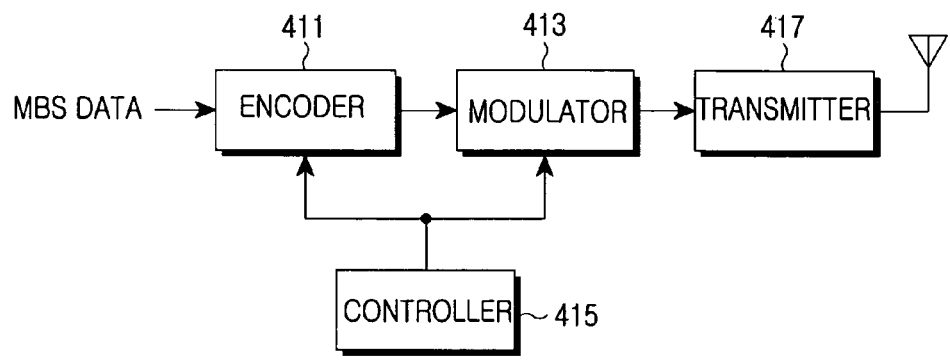
FIG. 4 is a block diagram of an MBS data transmitter according to the present invention.

FIG. 4 is a block diagram of an MBS data transmitter according to the present invention.

Referring to FIG. 4, the MBS data transmitter includes an encoder 411, a modulator 413, a controller 415, and a transmitter 417.

Upon generation of MBS data to be sent, the encoder 411 encodes the MBS data to a codeword according to a coding scheme under the control of the controller 415. The coding scheme is specified by an MCS level decided by the controller 415. The controller 415 selects the most robust MCS level or an MCS level according to the channel statuses of MSs to receive the same type of MBS data.

The modulator 413 modulates the codeword in a predetermined modulation scheme under the control of the controller 415. The controller 415 decides on the modulation scheme in accordance with the selected MCS level. The transmitter 417 constructs a frame using the modulated signal under the control of the controller 415 and sends the frame to an MBS data receiver through an antenna. The controller 415 controls the frame construction such that the fame is constructed in the IR scheme, i.e. the frame includes a plurality of subframes. The IR-based frame configuration has been described before.

In the case where the MBS data transmitter decides an MCS level for MBS data considering the channel statuses of MSs to receive the MBS data, with respect to each MBS type, it is clear that the MBS data transmitter includes a CQI receiver. Decision as to CQI feedback periods for the MSs in the controller 415 has been described before.

Figure 5:
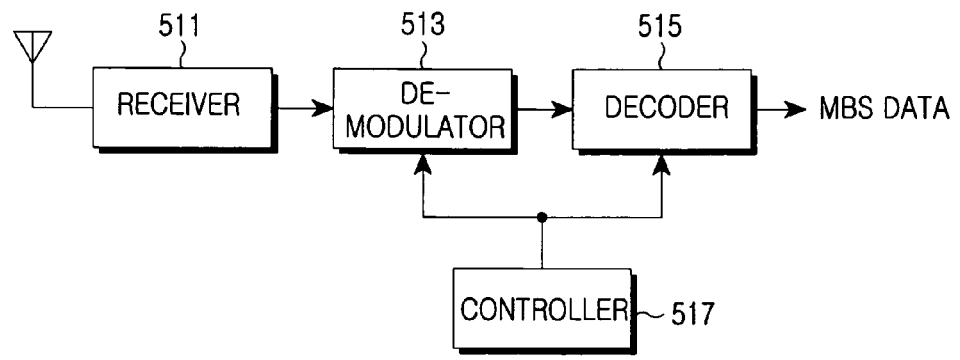
FIG. 5 is a block diagram of an MBS data receiver according to the present invention.

FIG. 5 is a block diagram of an MBS data receiver according to the present invention.

Referring to FIG. 5, the MBS data receiver includes a receiver 511, a demodulator 513, a decoder 515, and a controller 517.

The receiver 511 processes a signal received from the MBS data transmitter via an antenna on a subframe-by-subframe basis under the control of the controller 517. The controller 517 has prior knowledge of the MCS level used in the MBS data transmitter and thus controls the operation f the MBS data receiver in accordance with the MCS level.

The demodulator 513 demodulates a signal received from the receiver 511 in a demodulation scheme corresponding to the modulation scheme used in the MBS data transmitter under the control of the controller 517. The decoder 515 decodes the demodulated signal in a decoding scheme corresponding to the coding scheme used in the encoder 411 under the control of the controller 517, thereby recovering MBS data. As stated before, the MBS data receiver operates in the IR scheme. That is, the MBS data receiver does not receive any more subframes if it succeeds in recovering the MBS data, which has been described already.

While not shown, in the case where the MBS data transmitter decides an MCS level for MBS data considering the channel statuses of MSs to receive the MBS data, with respect to each MBS type, it is clear that the MBS data receiver includes a CQI transmitter for feeding back a CQI. In this case, a CQI feedback period is determined by the MBS data transmitter, as described before.

As is apparent from the above description, the present invention advantageously minimizes processing power consumption in an MS by sending/receiving MBS data in an IR scheme in a communication system. Also, the MBS data transmission/reception is carried out according to the channel statuses of MSs to receive MBS data, with respect to each MBS type. The resulting minimization of downlink resource consumption leads to the increase of downlink resource efficiency.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for transmitting Multicast/Broadcast Service (MBS) data by a Base Station (BS) in a communication system, the method comprising the steps of:
receiving Channel Quality Information (CQI) from a plurality of Mobile Stations (MSs) receiving a same type of MBS data, wherein the plurality of MSs includes at least three MSs;
detecting a first MS having a most inferior channel status among the plurality of MSs receiving the same type of MBS data, based on the received CQI;
determining a Modulation and Coding Scheme (MCS) level for the MBS data based on the CQI received from the first MS;
transmitting, to the first MS, a first message indicating to feed back CQI in a first period;
transmitting, to all other MSs, except the first MS, among the plurality of MSs receiving the same type of MBS data, a second message indicating to feed back CQI in a second period, wherein the second period is configured to be longer than the first period;
detecting a second MS, different from the first MS, as having the most inferior channel status based on the CQI received during the first period and the second period; and
when the second MS is detected as having the most inferior channel status based on the CQI received during the first period and the second period, changing the MCS level based on the CQI received from the second MS, and transmitting information on the changed MCS level to the plurality of MSs; and
determining MCS levels differently for different types of MBS data, and changing MCS levels each time an MS having a most inferior channel status for each of the types of MBS data changes.

2. The method of claim 1, further comprising:
generating a codeword including the MBS data and a parity by encoding the MBS data using the changed MCS level;
generating code symbols from the codeword using an Incremental Redundancy (IR) scheme; and
transmitting each of the code symbols in a corresponding subframe.

3. The method of claim 2, wherein a number of subframes for receiving the code symbols is determined based on the changed MCS level.

4. The method of claim 1, wherein the changed MCS level is different from a most robust MCS level among available MCS levels in the communication system, and
wherein the MBS data is encoded using a higher coding rate than used with the most robust MCS level.

5. The method of claim 1, wherein an MCS level according to each type of MBS data is differently determined according to channel statuses of a plurality of MSs receiving each type of the MBS data, respectively.

6. A Base Station (BS) for transmitting Multicast/Broadcast Service (MBS) data in a communication system, the BS comprising:
- a transmitter;
- a receiver configured to receive Channel Quality Information (CQI) from a plurality of Mobile Stations (MSs) receiving a same type of MBS data, wherein the plurality of MSs includes at least three MSs; and
- a controller configured
  - to detect a first MS having a most inferior channel status among the plurality of MSs receiving the same type of MBS data, based on the received CQI,
  - to determine a Modulation and Coding Scheme (MCS) level for the MBS data based on the CQI received from the first MS, to control the transmitter transmit, to the first MS, a first message indicating to feed back CQI in a first period,
  - to control the transmitter to transmit, to all other MSs, except the first MS, among the plurality of MSs receiving the same type of MBS data, a second message indicating to feed back CQI in a second period, wherein the second period is configured to be longer than the first period,
  - to detect a second MS, different from the first MS, as having the most inferior channel status based on the CQI received during the first period and the second period, when the second MS is detected as having the most inferior channel status based on the CQI received during the first period and the second period, to change the MCS level based on the CQI received from the second MS, and to control the transmitter to transmit information on the changed MCS level to the plurality of MSs,
- wherein the controller is configured to determined MCS levels differently for different types of MBS data, and to change MCS levels each time an MS having a most inferior channel status for each of the types of MBS data changes.

7. The BS of claim 6, wherein the controller generates a codeword including the MBS data and a parity by encoding the MBS data using the changed MCS level, generates code symbols from the codeword using an Incremental Redundancy (IR) scheme, and controls the transmitter to transmit each of the code symbols in a corresponding subframe.

8. The BS of claim 7, wherein a number of subframes for receiving the code symbols is determined based on the changed MCS level.

9. The BS of claim 6, wherein the changed MCS level is different from a most robust MCS level among available MCS levels in the communication system, and
  wherein the MBS data is encoded using a higher coding rate than used with the most robust MCS level.

10. The BS of claim 6, wherein an MCS level according to each type of MBS data is differently determined according to channel statuses of a plurality of MSs receiving each type of the MBS data, respectively.

* * * * *